United States Patent
Wu Hsiao et al.

(10) Patent No.: US 7,335,303 B2
(45) Date of Patent: Feb. 26, 2008

(54) ZERO-DISCHARGE OF WATER GLASS EFFLUENTS BY ALKALINE BIOTREATMENT TECHNIQUES

(75) Inventors: Ru-rong Wu Hsiao, Taipei (TW); Mei-hsien Yeh, Hualien County (TW); Hsiu-ping Pearl Lin, Tempe, AZ (US)

(73) Assignee: Development Center for Biotechnology, Taipei (TW)

( * ) Notice: Subject to any disclaimer, the term of this patent is extended or adjusted under 35 U.S.C. 154(b) by 491 days.

(21) Appl. No.: 10/693,207

(22) Filed: Oct. 23, 2003

(65) Prior Publication Data

US 2004/0140448 A1 Jul. 22, 2004

Related U.S. Application Data

(60) Provisional application No. 60/442,459, filed on Jan. 22, 2003.

(51) Int. Cl.
*C02F 3/00* (2006.01)
(52) U.S. Cl. .................. 210/610; 210/615; 210/616; 210/617; 210/631
(58) Field of Classification Search .......... 210/601, 210/610, 615–617, 631
See application file for complete search history.

(56) References Cited

U.S. PATENT DOCUMENTS

| | | | |
|---|---|---|---|
| 4,088,571 A * | 5/1978 | Helgesson | 210/615 |
| 5,871,648 A | 2/1999 | Allen et al. | |
| 5,965,027 A | 10/1999 | Allen et al. | |
| 6,312,601 B1 | 11/2001 | Allen et al. | |
| 6,428,705 B1 * | 8/2002 | Allen et al. | 210/638 |
| 6,773,594 B1 * | 8/2004 | van der Wijngaart | 210/605 |
| 6,818,131 B2 * | 11/2004 | Sha et al. | 210/616 |
| 6,846,483 B2 * | 1/2005 | Kumar et al. | 424/93.46 |
| 2004/0016705 A1 * | 1/2004 | Umezawa et al. | 210/724 |

FOREIGN PATENT DOCUMENTS

| | | |
|---|---|---|
| JP | 55-149121 | 11/1980 |
| JP | 63216472 A | 9/1988 |
| JP | 01-159098 | 6/1989 |
| JP | 2002086188 A | 3/2002 |
| JP | 2002-143780 | 11/2003 |

OTHER PUBLICATIONS

Office Action dated Jul. 22, 2005, from the Chinese Patent Office in a corresponding Chinese application (Application No. 200410007320.6 filed on Jan. 21, 2004).

* cited by examiner

*Primary Examiner*—Chester T. Barry
(74) *Attorney, Agent, or Firm*—Finnegan, Henderson, Farabow, Garrett & Dunner, L.L.P.

(57) ABSTRACT

The present invention relates to the collection of alkalophilic/alkaline-tolerant microbes and use of said microbes in water glass wastewater treatment. The wastewater is treated directly with alkalophilic/alkaline-tolerant microbes cultured on granular activated carbon without any prior pH adjustment. Subsequently, water glass is separated from the biotreated water by lowering its pH. Alternatively, water glass is separated from biotreated water by distilling the water as water and water glass have different boiling points.

12 Claims, 9 Drawing Sheets
(8 of 9 Drawing Sheet(s) Filed in Color)

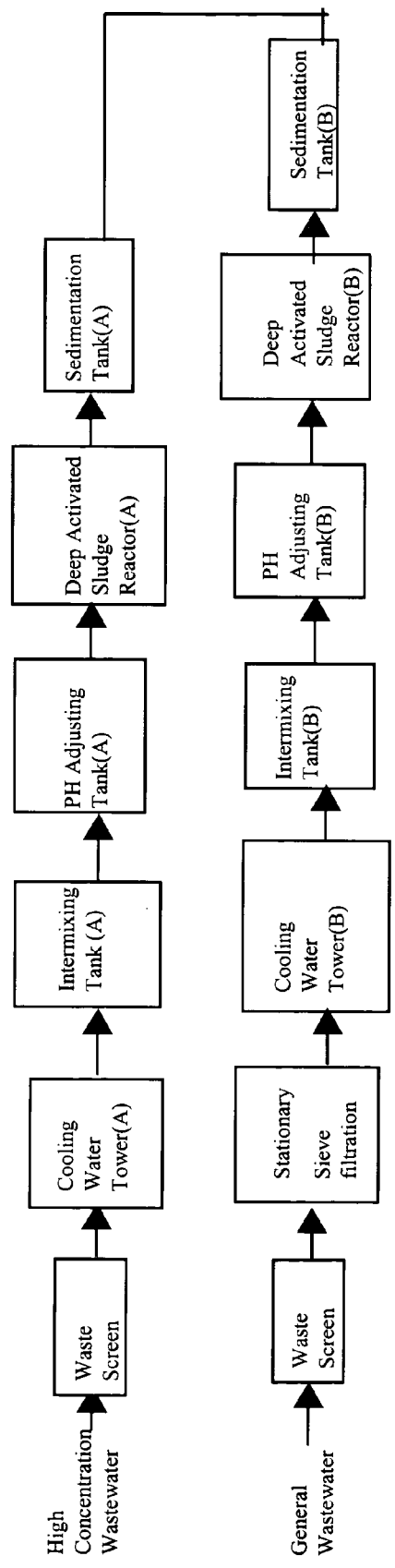
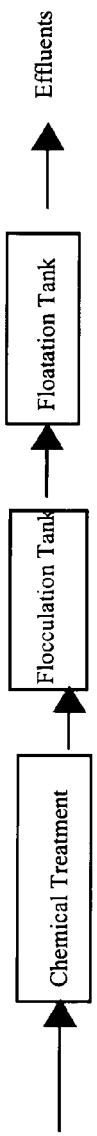
Figure1. Flow Diagram of On-Site Wastewater Treatment Processes

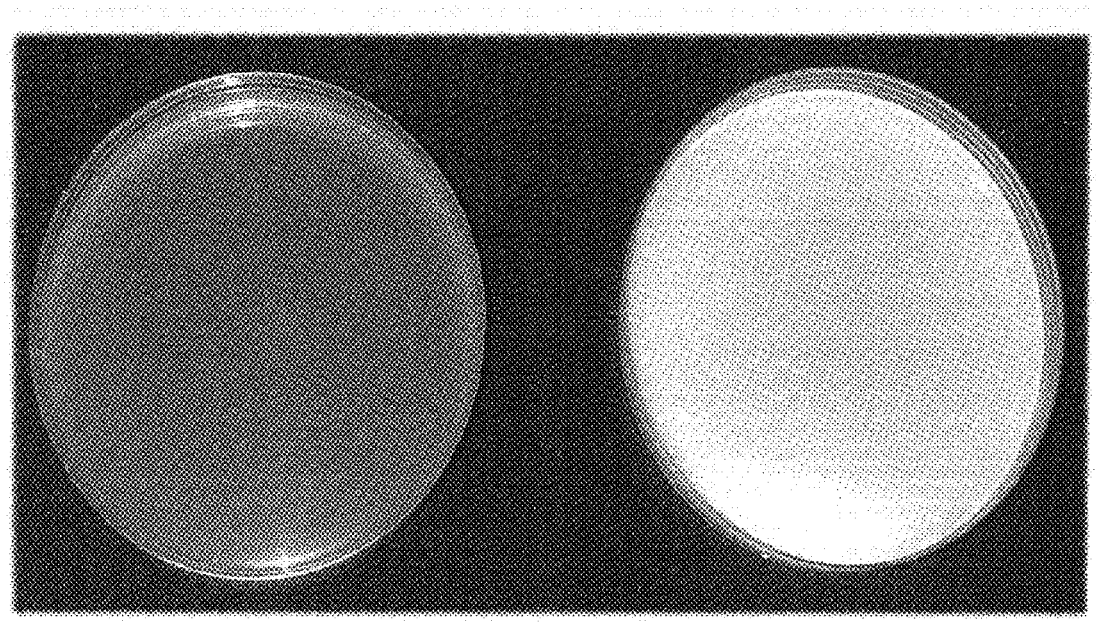
Figure 2. Results of "Water Glass Wastewater agar plate, PH 11.5".
The control petri dish(left) is not implanted with microbes, while the experimental petri dish(right) is implanted with the screened microbes

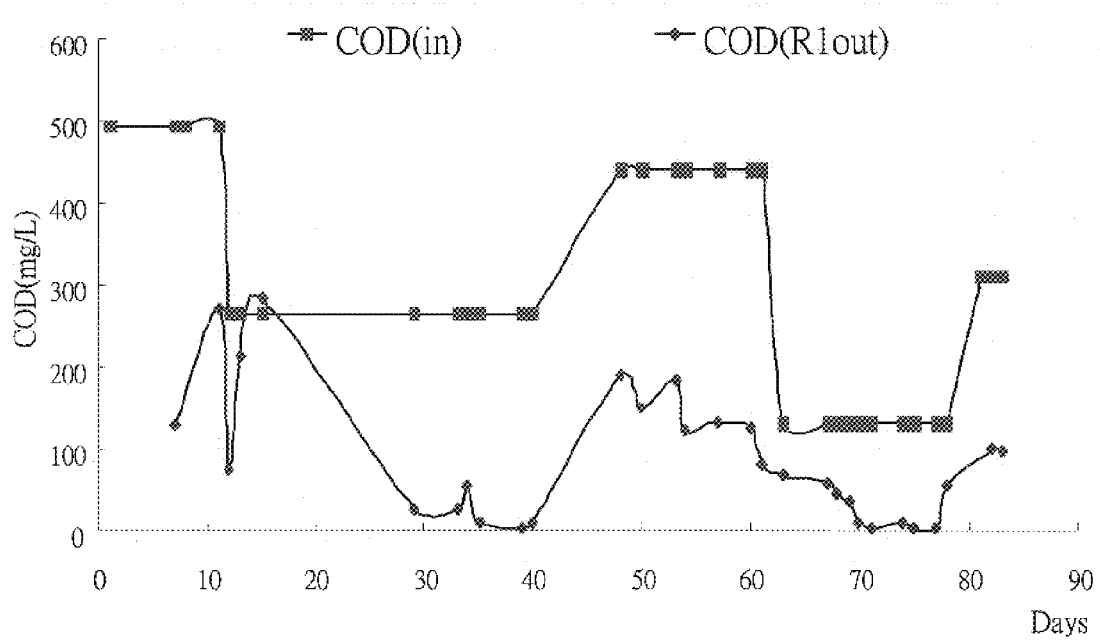
Figure 3. Evaluation of the Efficiency in Reducing the COD Value of Water Glass Wastewater Treated by alkaline BAC Treatment (2.1 L Reactor, HRT 1.5 Days)

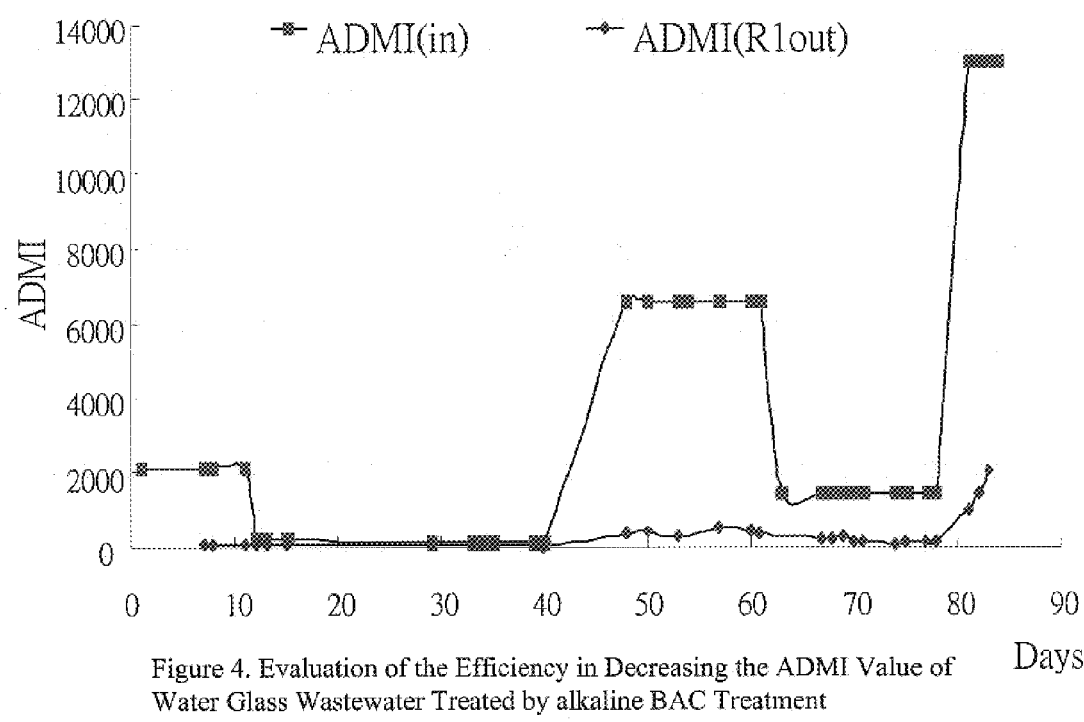
Figure 4. Evaluation of the Efficiency in Decreasing the ADMI Value of Water Glass Wastewater Treated by alkaline BAC Treatment (2.1 L Reactor, HRT 1.5 Days)

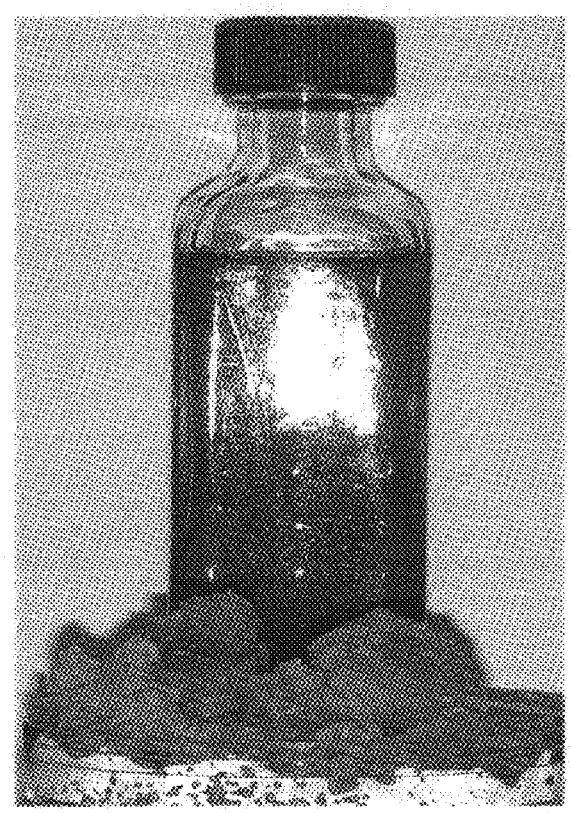
Figure 5 Separation of Wastewater and Water Glass From the Water Glass Wastewater

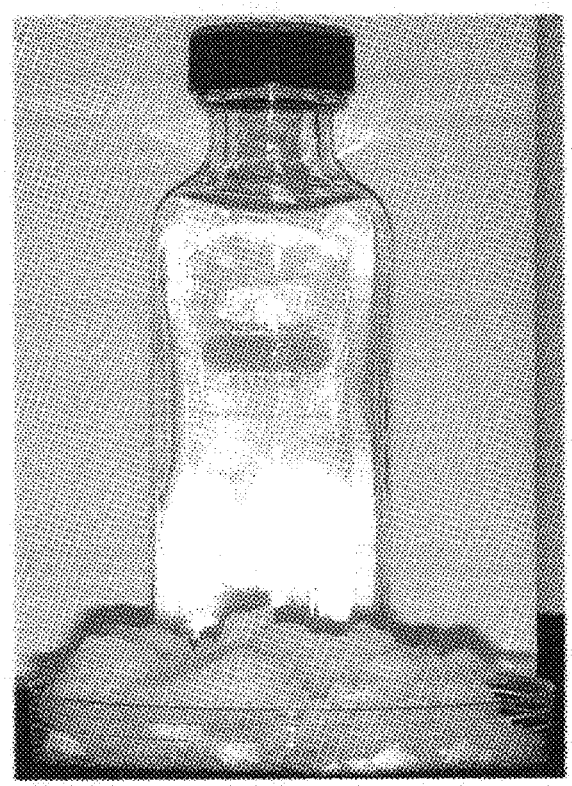
Figure 6 Recycled Water Glass Obtained After Water Glass Wastewater Undergoes Biological Purification

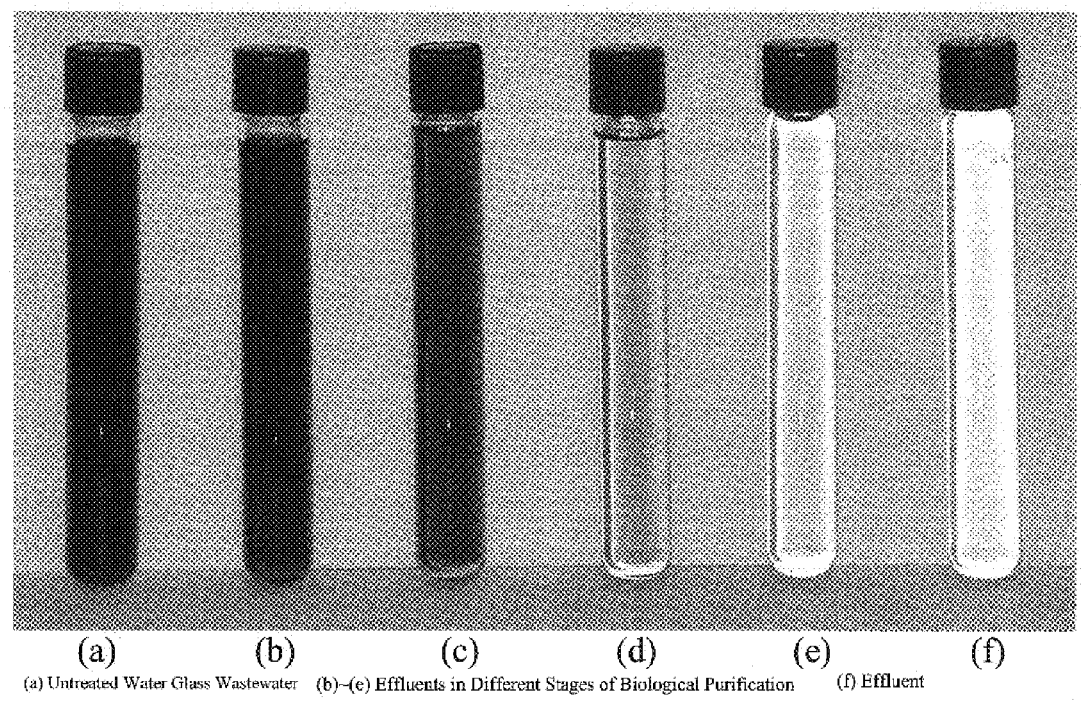
Figure 7 Color Comparison of Different Stages of Water Glass Wastewater Undergoing Biological Purification

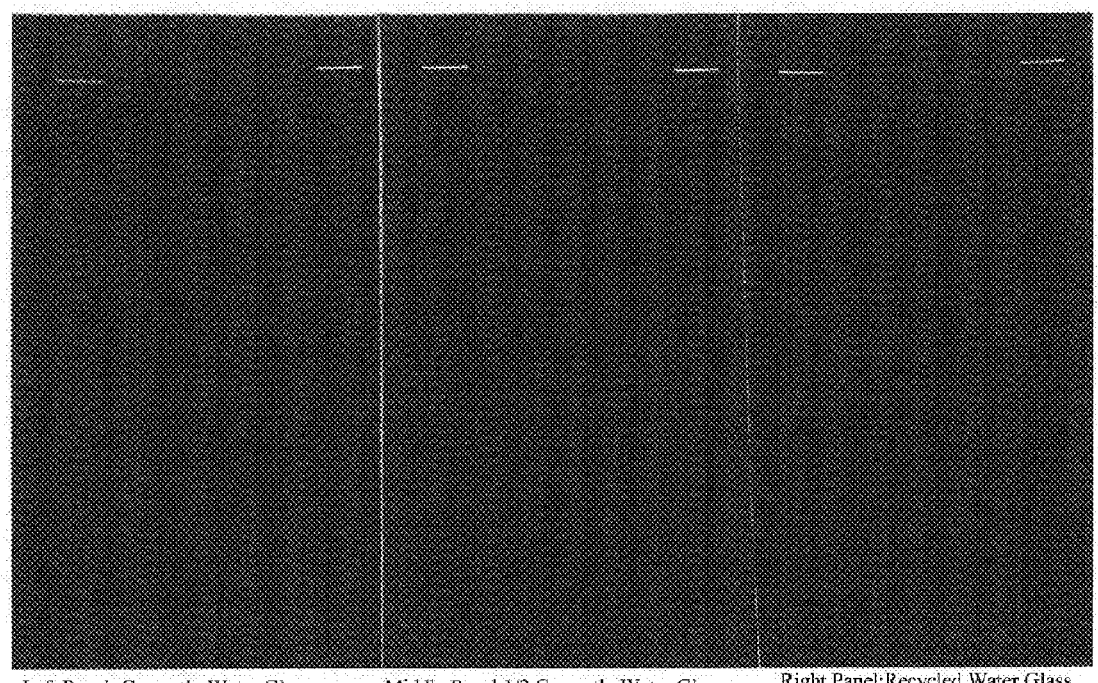
Left Panel: Currently Water Glass   Middle Panel: 1/2 Currently Water Glass Used and ½ Recycled Water Glass   Right Panel: Recycled Water Glass
Figure 8. Comparison of Using the Recycled Water Glass, Obtained From Biologically Purified Water Glass Wastewater, in the Dyeing Process(Blue Color)

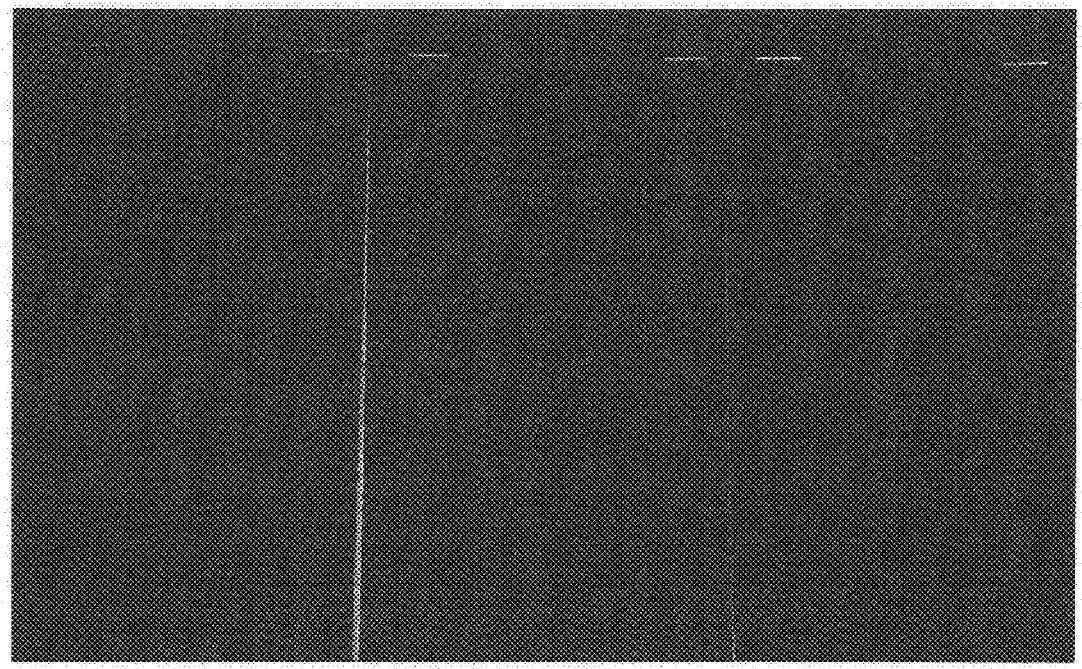
Left Panel: Currently Water Glass    Middle Panel: ½ Currently Water Glass    Right Panel:Recycled Water Glass
and ½ Recycled Water Glass
Figure 9. Comparison for Using Recycled Water Glass, Obtained From Biologically Purified Water Glass Wastewater, in the Dyeing Process (Red Color)

ZERO-DISCHARGE OF WATER GLASS EFFLUENTS BY ALKALINE BIOTREATMENT TECHNIQUES

This application claims the benefit of U.S. Provisional Application No. 60/442,459, filed on Jan. 22, 2003.

BACKGROUND OF THE INVENTION

1. Field of Invention

This invention relates generally to the treatment of water glass wastewater and more particularly to obtaining alkalophilic/alkaline-tolerant microbes and the use of alkalophilic/alkaline-tolerant microbes cultured on granular activated carbon to directly treat water glass wastewater without any prior pH adjustment and then subsequently recycle water glass from water resource by the different chemical and physical properties of water glass and water.

2. Description of Related Art

The definition of "water glass" is a solution containing colloidal silica particles. Soluble silicates contain three components which all provide some value in consumer applications. Silica is the primary constituent of all soluables silicates. Virtually all of the end-use applications utilize the chemistry of silica. Alkali is also a key component of a soluble silicate. It can be in either a sodium or potassium oxide form and it is responsible for maintaining silica solubility. Water is the third ingredient. While there are anhydrous silicate products available, most contain substantial amounts of water. In almost all cases, water must be added to take advantage of the silica functionality. Sodium silicates or waterglass($Na_2O \cdot XSiO_2$) are metal oxides of silica. All soluble silicates can be differentiated by their ratio, defined as the weight proportion of silica to alkali ($SiO_2/Na_2O$). Ratio determines the physical and chemical properties of the product.

Sodium silicate or waterglass($Na_2O \cdot XSiO_2$) is alkaline (pH>11.5). Water glass wastewater is also alkaline (pH usually above 11.0), however, the pH value of the water glass effluent varies according to the water glass concentration of the effluent. Water glass effluent from the textile dyeing industry have pH values as high as 11.5. Once the pH value of water glass effluent is lowered, even with a slight decrease, water glass effluent will coagulate or form solid water glass suspension. In essence, these reactions involve the destabilization of liquid silicate solutions. When the pH value of a liquid silicate is modified to a point below 11, the silica is destabilized and the system polymerizes or gels.

In conventional water glass wastewater treatment, the wastewater is diverted into a neutral biotreatment pond and coagulates or becomes solid water glass suspension, forming inefficacious sludge and purging the effectual biological sludge. Further physical and chemical treatments then lead to the formation of chemical sludge and water glass sludge. The sludge can block the pipes so as to require additional cleaning and removal efforts. Taking the water glass effluent produced by the textile dyeing industry as an example, one ton of water glass wastewater produces 0.3 tons of water glass sludge, which blocks the on-site pipes and gives rise to problems for cleaning and removal of the sludge, severely reducing the efficiency of the on-site activated sludge and chemical treatments.

The sludge formed from conventional water glass wastewater treatment is the cause of the low efficiency in such wastewater processing. Therefore, there is the need for an improved method of water glass wastewater treatment.

SUMMARY OF THE INVENTION

The present invention is directed to a method for treating water glass wastewater comprising the step of said wastewater being bio-degraded by alkalophilic/alkaline-tolerant microbes growing on granular activated carbon (GAC) with said water glass wastewater without any prior pH adjustment. Granular activated carbon (GAC) helps concentrate the pollutants of water glass wastewater to be bio-regenerated by alkalophilic/alkaline-tolerant microbes. In another embodiment of the present invention, said method further comprises the step of separating water glass from water resource after treatment with the alkalophilic/alkaline-tolerant microbes on GAC. Said step of separating water glass from water resource comprises the step of lowering the pH of said wastewater after being bio-degraded by alkalophilic/alkaline-tolerant microbes growing on granular activated carbon (GAC) and recycling coagulated water glass. Additionally, the pH may be lowered to less than 11 or within a range of 6–11. In another embodiment of the invention, said step of separating water glass from water resource after treatment with alkalophilic/alkaline-tolerant biofilm on GAC (BAC) comprises the step of distilling the treated water. According to a preferred embodiment of the present invention, said distillation may be set to obtain a solution with $Na_2O$ concentration of 7–12% or any $Na_2O$ concentration depending on the need of the recycling market.

The present invention advantageously provides a method for obtaining alkalophilic/alkaline microbes comprising the steps of collecting microbes from water treatment facilities and culturing said microbes in water glass wastewater, wherein said wastewater has an ADMI value of 108 to 44,600 and pH value of 11–12.

The present invention further provides for a composition for dyeing textiles comprising a mixture of purchased water glass and recycled water glass. In a preferred embodiment of the present invention, said composition comprises water glass and recycled water glass at a 1:1 ratio.

The present invention further provides a method for treating water glass wastewater comprising the steps of obtaining alkalophilic/alkaline-tolerant microbes, treating said water glass wastewater without any prior pH adjustment by alkalophilic/alkaline-tolerant biofilm on GAC, separating water glass from water by lowering the pH of said wastewater being bio-degraded with alkalophilic/alkaline-tolerant microbes, recycling coagulated water glass from water.

Another embodiment of the present invention further provides a method for treating water glass wastewater comprising the steps of obtaining alkalophilic/alkaline-tolerant microbes, treating said water glass wastewater, without any prior pH adjustment, by alkalophilic/alkaline-tolerant biofilm on GAC, and recycling water glass from water by distilling said wastewater being bio-degraded with alkalophilic/alkaline-tolerant biofilm on GAC.

In a preferred embodiment of the present invention, the method for treating water glass wastewater comprises the steps of collecting microbes from wastewater treatment facilities, culturing said microbes in water glass wastewater with ADMI value ranging from 108 to 44,600 and pH value of 11–12, treating said water glass wastewater without any prior pH adjustment by alkalophilic/alkaline-tolerant biofilm on GAC, and recycling water glass from water by lowering pH of said wastewater being bio-degraded with said microbes, and recycling the coagulated water glass from water.

In another preferred embodiment of the present invention, the method for treating water glass wastewater comprises the steps of collecting microbes from water treatment facilities, culturing said microbes in water glass wastewater with ADMI value ranging from 108–44,600 and pH value of 11–12, treating said water glass wastewater, without any prior pH adjustment, by alkalophilic/alkaline-tolerant biofilm on GAC, and separating water glass from water resource by distilling said wastewater after treatment with alkalophilic/alkaline-tolerant biofilm on GAC to obtain a solution with $Na_2O$ concentration of 7–12% or any $Na_2O$ concentration depending on the need of the recycling market.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a flow diagram of the on-site wastewater treatment processes.

FIG. 2 shows the results of the cultured and screened decomposing microbes grown on "water glass wastewater agar plate, pH 11.5" (right), and plate on left is "water glass wastewater agar plate, pH 11.5" without innoculum.

FIG. 3 shows the result of the evaluation of the efficiency in reducing the COD value of water glass wastewater treated by alkaline BAC treatment.

FIG. 4 shows the result of the evaluation of the efficiency in decreasing the ADMI value of water glass wastewater treated by alkaline BAC treatment.

FIG. 5 shows the separation of wastewater and water glass from the water glass wastewater.

FIG. 6 shows recycled water glass obtained after water glass wastewater undergoes alkaline BAC purification.

FIG. 7 shows the color comparison of different stages of water glass wastewater undergoing alkaline BAC purification.

FIG. 8 shows the result of using the recycled water glass, obtained from biologically purified water glass wastewater, in the dyeing process (blue color).

FIG. 9 shows the result of using recycled water glass, obtained from biologically purified water glass wastewater, in the dyeing process (red color).

DETAILED DESCRIPTION OF THE INVENTION

The present invention relates to the culture and use of alkalophilic/alkaline-tolerant microbes in the alkaline BAC treatment of water glass wastewater.

The present invention stems from the basic nature of microbes and utilization of that nature. Microbes reproduce in various manners, i.e. binary fission, spore formation etc., and at a very fast speed, for example bacteria can divide every nine minutes. Due to the fast reproduction rate, random mutations occur often enough to play a significant role in helping the microbes to survive and adapt to an ever-changing environment. By securing a sizable amount of microbes, one has a collection of microbes that will live under different and ever-changing conditions. Over 10,000 microbes of various species and strains are collected over the years from different sources, i.e. wastewater treatment facilities of various industries. The collected microbes are cultured in the alkaline water glass wastewater. By natural selection, microbes most suitable under the alkaline environment of the water glass wastewater will survive and multiply. By the same token, even with water glass wastewater having different characteristics, i.e. wastewater produced under different conditions and or from different facilities, different microbes from the collection of microbes will adapt and or evolve to survive under the different conditions. Then, after culturing the collection of microbes in the water glass wastewater, microbes survived under the water glass wastewater environment are checked for growth by placing them on a solid ⌈water glass wastewater agar plate⌋. The alkalophilic/alkaline-tolerant microbes are then fixed on granular activated carbon in reactors through which the wastewater flows in and out at a steady rate. The water glass wastewater are purified by the filtering biotreatment process directly without any prior adjustments of chemical or biological treatments. After the bio-filtering process, water glass and water can be separated from the biotreated water by changing the pH of the biotreated water to a less basic value. Upon lowering the pH, water glass tends to coagulate or solidify. The degree of pH adjustment required to cause the coagulation depends on the water glass concentration of the biotreated water. Usually water glass coagulates once the pH is adjusted to a range between 6–11. Alternatively, water glass and water can also be separated by distilling the biotreated water since water glass and water have different boiling points. The recycled water glass separated from the biotreated water, can be reused. From the economic perspective, the water treatment method of the present invention is also cost effective in that annual operation cost is much less than that of the traditional water treatment procedure. Large amount of chemical treatment and cleaning expense can be eliminated, and the cost of building a new plant of the present invention can be returned in one year from the saving of traditional activated sludge treatment chemical treatment and sludge-cleaning expenses usually incurred in a single year.

EXAMPLE

For the woven fabric textile dye factories, there are the continuous dyeing services (A-plant) and immersion dyeing services (B-plant). Main products include pure cotton 19.8%, T/C 22%, PET (containing Nylon) 42% and Tencel 14.2% etc. Using calculations based on product type distribution, the one time color agreement rate of 95% and average water usage, per product unit, of 65~70 L/kg are reasonable outcomes.

The current on-site wastewater treatments employ deep activated sludge system and chemical coagulation system. On-site wastewater is divided into two separate plants for independent deep activated sludge treatments, referring to FIG. 1: A-plant—high concentration effluents from desizing, mercerizing and steam treating (containing water glass) process, B-plant—low COD concentration effluents from dyeing wastewater and fixing wastewater. The biotreated wastewater effluents mix together for further chemical treatment. The treated wastewater effluents has COD of about 50~170 mg/L, which may not reach the direct discharge permit but meets the discharge receiving requirements to the industry park for further treatments. Since water glass results in inferior efficiency of the wastewater treatment for the A-plant treatment system, referring to the analytical results shown in Table 1 and 2 below, water glass wastewater should be treated individually so as not to diminish the total efficiency. The current biological treatment systems are categorized as system A (A-plant) and system B (B-plant). System A has a water retention time as long as 60 hours, while the water retention time of system B is 13.5 hours. If water glass wastewater is treated in a separate procedure and systems A and B are put in series, the treatment efficacy of these two systems will increase significantly.

TABLE 1

Analytical results of on-site sample from the pipe terminal treatment in Plant A (2002/03/05).

| | pH | COD (mg/L) | BOD (mg/L) | Conductivity (mS/cm) | True color ADMI | $NH_4$—N (mg/L) | $PO_4$—P (mg/L) | OUR (mg/L/h) |
|---|---|---|---|---|---|---|---|---|
| Mixed wastewater | 11.99 | 2800 (2690) | 760 (720) | 10.78 | 1171 | 0.23 | 12.2 | |
| Activated sludge reactor | 9.80 | (509) | | | | | | 14.1 35.1$_{(fed)}$ |
| Biological precipitation tank | 9.51 | (596) | (10) | 10.05 | 1436 | 0.8 | 3.90 | |
| Before chemical treatment | 8.19 | 586 (294) | 3 | 4.92 | 1390 | 0.77 | 1.77 | |
| After chemical treatment | 7.06 | 220 (165) | 2.4 | 5.16 | 925 | 2.81 | 0.47 | |

Note:
Values in parenthesis are values measured without the solid suspension, and values without parenthesis are values measured with the solid suspension

TABLE 2

Analytical results of on-site sample from the wastewater treatment in Plant B (2002/03/05).

| | pH | COD (mg/L) | BOD (mg/L) | Conductivity (mS/cm) | True color ADMI | $NH_4$—N (mg/L) | $PO_4$—P (mg/L) | OUR (mg/L/h) |
|---|---|---|---|---|---|---|---|---|
| Mixed wastewater | 12.04 | 1382 (1330) | 390 (320) | 5.27 | 888 | 0.27 | 3.45 | |
| Activated sludge reactor | 8.01 | (211) | | 3.85 | 847 | 0.98 | 2.68 | 16.4 143.5$_{(fed)}$ |
| Biological precipitation tank | 7.69 | (314) | (3) | 4.46 | 1399 | 0.7 | 1.69 | |
| Before chemical treatment | 8.19 | 586 (294) | 3 | 4.92 | 1390 | 0.77 | 1.77 | |
| After chemical treatment | 7.06 | 220 (165) | 2.4 | 5.16 | 925 | 2.81 | 0.47 | |

Water Quality Analytical Methods
COD: refer to Standard Methods 508C. Closed Reflux, Colorimetric Method
MLSS: refer to NIEA W210.55A
$NH_4^+$: MERCK SQ-118 colorimeter; analytical method number: 14752-Method number 6
$PO_4^{3-}$: MERCK SQ-118 colorimeter; analytical method number: 14842-Method number 84
pH: SUNTEX TS-2 pH meter
BOD: refer to NIEA W510.50A
Conductivity: refer to NIEA W203.51B
VSS: Standard Methods 209D Fixed and Volatile Solids Ignited at 550° C.
True color: refer to NIEA W223.50B
OUR (unfed) Test: water sample of 400 ml is taken from the activated sludge reactor, aerating until saturation (for about 5 minutes), and then transferred to the BOD bottle to measure the oxygen uptake rate.
OUR (fed) Test: adding a certain amount of wastewater that is to be entered the activated sludge system to the BOD bottle, taking water sample of 400 ml from activated sludge reactor, aerating until saturation (for about 5 minutes), and transferring the water sample to the BOD bottle for measuring the oxygen uptake rate.

Culturing and Screening Decomposing Microbes for Water Glass Wastewater

Microbes are collected over the years from various sources, i.e. water treatment plants of different industries. The collected microbes are directly placed in water glass wastewater ranging from 108 ADMI to 44,600 ADMI and pH at 11.5 for culturing. See Table 3 below for analytical results of water glass wastewater. Then, add 1.5% of BACTO-AGAR to water glass wastewater with the pH of 11.5, sterilized in the autoclave, and then cooled to 50° C. In the LAMINAR FLOW, the solution is divided into sterilized petri dishes. As the ⌈wastewater agar plate⌋ is set, the petri dishes are divided into two groups, i.e. control and experimental. The control petri dishes are not implanted with microbes, while the experimental petri dishes are implanted with the screened microbes. The petri dishes are placed into the incubator at 30° C. After forty-eight (48) hours, the control petri dishes stay clean while the experimental petri dishes contain white growth, see FIG. 2. A portion of the agar from the experimental Petri dish is removed and washed with sterilized water. The wash is observed under a 1000× microscope, and a lot of microorganisms are found.

TABLE 3

Analytical results of sample water glass wastewater.

| | Number of Samples | pH | COD (mg/L) | BOD (mg/L) | Conductivity (mS/cm) | True color ADMI |
|---|---|---|---|---|---|---|
| Water glass wastewater | >40 | 11–12 | 131$_{(min)}$ 1476$_{(max)}$ | 5–30 | 10–40 | 108$_{(min)}$ 44,600$_{(max)}$ |

Note:
the COD value of the water glass wastewater is only listed for reference, because the COD analysis of the water glass wastewater is subject to interference.

Continuous Biological Treatment of Water Glass Wastewater in the Laboratory

Microbes screened from water glass wastewater are cultured on granular activated carbon which acts as a carrier and pollutants concentrator. Then the cultured BAC was placed in a 2.1-liter treatment reactor where the biological activated carbon (BAC) occupies 80% of the total volume of the reactor. The water glass wastewater remains in a steady upflow into and out of the reactor with the retention time flexibly adjusted dependent on the analytical results of the wastewater entering into the reactor, i.e. COD and true color values. The basic principle is to keep the system stable. For water glass wastewater having true color larger than 10000 ADMI, the water glass wastewater is treated by using multiple reactors. Color decoloration of the wastewater is readily observed from one reactor to another reactor, see FIG. 7. The COD values of the influents and the effluents are measured and shown in FIG. 3. Under the water environment of pH 11.5, biological activated carbon treatment (BAC) obviously reduces the COD values of the wastewater. True color of the influents and the effluents are analyzed and shown in FIG. 4. Under the water environment of pH 11.5, biological activated carbon treatment evidently decolorizes the water to nearly colorless.

Continuous Biological Activated Carbon Treatment of Water Glass Wastewater at the Site On a larger scale, the water glass wastewater decomposing microbes are cultured on activated carbon and then placed in 20-liter quartet treatment reactors, where the biological activated carbon occupies 90% of the total volume of the treatment reactor. Water glass wastewater remains in a steady flow into and out of the reactor with a retention time of 3.9 days. After the system stabilizes, it is moved out of the laboratory and onto the wastewater treatment site to run under the same conditions. The COD values and the true color of the influents and the effluents are analyzed and shown in Table 4 below. Under the liquid environment of pH11.5, the alkaline BAC treatment can evidently reduce the COD value of the water glass wastewater by 90% and decolorize the wastewater to nearly colorless.

TABLE 4

Evaluation results of on-site water glass effluent treated by the alkaline biotreatment (20 L reaction tank).

| Date | days | COD (in) mg/L | COD (out) mg/L | ADMI (in) | ADMI (out) |
|---|---|---|---|---|---|
| 11/28 | 37 | 242 | | 6076 | |
| 11/29 | 38 | 242 | 15 | 6076 | 40 |
| 12/02 | 41 | 468 | | 9151 | |
| 12/03 | 42 | 468 | 173 | 9151 | 53 |
| 12/06 | 45 | 468 | 57 | 9151 | 70 |
| 12/09 | 48 | 728 | | 4226 | |
| 12/10 | 49 | 728 | 15 | 4226 | 97 |
| 12/12 | 51 | 724 | | 4146 | |
| 12/13 | 52 | 724 | 10 | 4146 | 99 |
| 12/16 | 55 | 822 | | 4128 | |
| 12/17 | 56 | 822 | 88 | 4128 | 64 |
| 12/19 | 58 | 751 | | 20653 | |
| 12/20 | 59 | 751 | 22 | 20653 | 146 |
| 12/26 | 65 | 605 | 42 | 44600 | 345 |
| 1/7 | 77 | 605 | 25 | 44600 | 77 |
| 1/10 | 80 | 286 | 63 | 6860 | 168 |
| 1/14 | 84 | 184 | 40 | 2132 | 86 |
| 1/22 | 92 | 165 | 31 | 2535 | 28 |
| 1/24 | 94 | 201 | 10 | 2597 | 19 |
| 1/29 | 99 | 223 | 39 | 2844 | 16 |
| 3/14 | 143 | 322 | 24 | 2673 | 16 |
| 3/21 | 150 | 342 | 25 | 3230 | 31 |
| 3/28 | 157 | 514 | 5 | 4450 | 83 |
| 4/1 | 161 | 481 | 41 | 5194 | 108 |

Separation of Water Glass and Water Resources From Biotreated Water

Subsequently, methods for separating and recycling water glass and water resources from the biotreated water are established by taking advantage of the fact that water glass and water have different physical and chemical properties. Different from water, water glass coagulates or solidifies rapidly at lower pH. Therefore, water glass and water are easily separated by adjusting the pH to a less basic value or neutral. FIG. 5 shows the result of separating water glass and wastewater from the water glass wastewater. FIG. 6 shows result of separating water glass from water resources after the water glass wastewater has undergone the alkaline biotreatment to reduce its COD and true color values to 35 mg/L and 57 ADMI respectively. In this case, pH value of the biotreated water is adjusted to 8. Another method used to separate water glass from water is to take advantage of the fact that water glass and water have different boiling points. Water glass wastewater first undergo alkaline biotreatment to reduce its COD and true color values to under 50 mg/L and 60 ADMI respectively. Then, water glass is separated from water by distilling the biotreated water glass wastewater (water glass and water have different boiling points). Physical and chemical properties of the recycled water glass effluent of different concentrations are analyzed, see Table 5. The biotreated effluent is distilled to remove 82.5% water and has the $Na_2O$ percentage approximating to that of the water glass concentration required for dyeing. The same concentration ratio is applied in the test of using recycled water glass in dyeing.

TABLE 5

Evaluation for the physical and chemical properties of the water glass effluent that was treated by the alkaline biotreatment and then concentrated.

| Analysis item | Density | pH | Conductivity (mS/cm) | $Na_2O$ (%) | $SiO_2$ (%) | $SiO_2/Na_2O$ ratio |
|---|---|---|---|---|---|---|
| Water glass (purchased) | 1.3685 | 11.81 | 35.0 | 11.21 | 26.54 | 2.37 |
| Biotreated effluent with 85% concentration ratio | 1.3318 | 11.63 | 48.4 | 8.41 | 19.71 | 2.34 |
| Biotreated effluent with 82.5% concentration ratio | 1.2717 | 11.85 | 48.2 | 7.56 | 17.91 | 2.36 |
| Biotreated effluent with 80% concentration ratio | 1.2262 | 11.71 | 47.4 | 6.64 | 15.9 | 2.39 |
| Biotreated effluent with 70% concentration ratio | 1.1006 | 11.69 | 45.2 | 5.35 | 12.34 | 2.31 |
| Biotreated effluent with 60% concentration ratio | 1.1309 | 11.68 | 40.5 | 3.97 | 8.7 | 2.19 |
| Biotreated effluent with 50% concentration ratio | 1.1047 | 11.66 | 35.8 | 3.22 | 6.8 | 2.11 |
| Biotreated effluent with 40% concentration ratio | 1.0791 | 11.63 | 32.4 | 2.72 | 5.17 | 1.9 |

Use of Recycled Water Glass in Dyeing Process

Water glass can be recycled for reuse in the dyeing process and other usages. Water glass wastewater first undergo alkaline BAC biotreatment, and then its pH is adjusted to neutral. Upon pH adjustment to neutral, water glass solidifies and water is removed. Solidified water glass can be reused in many ways, such as water proof building additive and so on. Alternatively, water glass separated from water using different boiling points is reused in the dyeing process and the result is shown in FIGS. 8 and 9. Both show some chromatism when compared with dyeing results from using regular non-recycled water glass. However, when the recycled water glass and the regular water glass are mixed in a 1:1 ratio for dyeing, the result becomes acceptable and is closer to the result of using regular or non-recycled water glass.

Economic Effectiveness of Alkaline Biotreatment Unit

Taking a short fiber textile dyeing factory with the wastewater discharge of 250 CMD water glass wastewater as an example, the construction cost of the alkaline BAC biotreatment unit is calculated to be 25 million New Taiwan (NT) dollars and the annual operating expense is calculated to be 0.3 million NT dollars. However, when compared with the operating costs of the conventional wastewater treatments for treating water glass wastewater, being 25.44 million NT dollars/per year (referring to Table 6), 25.14 million NT dollars are saved as the annual net profit (sum of savings—operation expense). Therefore, it is estimated that the construction cost of the alkaline BAC biotreatment unit can be returned in the first year, referring to Table 6.

TABLE 6

Evaluation for economic effectiveness of the extra biotreatment unit for treating water glass wastewater.
Unit: NT dollar

| | Cost items | Water glass effluents 250 CMD |
|---|---|---|
| Expense | Construction expense | 25,000,000 |
| | Operation expense (dollar/Year) | 300,000 |
| Savings | Acidifying cost | 1,260,000 |
| | Wastewater treatment cost | 1,860,000 |
| | Outsourcing sludge treatment cost | 22,320,000 |
| | Sum of savings | 25,440,000 |
| Net profits (sum of savings − operation expense) | | 25,140,000 |
| Return term | | One year |

Note:
1. Outsourcing sludge treatment cost is calculated based on 1,200 dollar/ton.

What is claimed is:

1. A method for treating water glass wastewater, comprising the steps of introducing alkalophilic/alkaline-tolerant microbes to biodegrade said wastewater without any prior pH adjustment of said wastewater and separating water glass from water after treatment with alkalophilic/alkaline-tolerant microbes.

2. The method of claim 1, wherein said step of separating water glass from water comprises the steps of lowering the pH of said wastewater being biodegraded by alkalophilic/alkaline-tolerant microbes to coagulate the water glass and removing coagulated water glass.

3. The method of claim 1, wherein said step of separating water glass from water comprises the steps of adjusting the pH of said wastewater being biodegraded by alkalophilic/alkaline-tolerant microbes to a range within 6–11 to coagulate the water glass and removing coagulated water glass.

4. The method of claim 1, wherein said step of separating water glass from water comprises the step of distilling said wastewater being biodegraded by alkalophilic/alkaline-tolerant microbes to remove water and concentrated water glass.

5. A method for separating water glass from water, comprising the step of adjusting the pH of the water containing water glass to a range within 6-11 to coagulate the water glass without using coagulant and removing coagulated water glass.

6. A method for separating water glass from water, comprising the step of distilling biotreated wastewater containing water glass to remove water to obtain the desired concentration of $Na_2O$ and $SiO_2$.

7. A method for treating water glass wastewater, comprising the steps of:
 (a) obtaining alkalophilic/alkaline-tolerant microbes;
 (b) introducing alkalophilic/alkaline-tolerant microbes to biodegrade said water glass wastewater without any prior pH adjustment of said wastewater; and
 (c) distilling said wastewater to separate water glass from water.

8. The method of claim 7, wherein said alkalophilic/alkaline-tolerant microbes are cultured on activated carbon.

9. A method for treating water glass wastewater, comprising the steps of:
 (a) collecting alkalophilic/ alkaline-tolerant microbes from water treatment facilities;

(b) culturing said microbes in water glass waste water with ADMI ranging from 200–45,000;
(c) introducing said microbes to biodegrade said water glass wastewater without any prior pH adjustment of said wastewater;
(d) lowering the pH of said wastewater to coagulate water glass; and
(e) removing coagulated water glass from water.

10. The method of claim 9, wherein said alkalophilic/alkaline-tolerant microbes are cultured on activated carbon.

11. A method for treating water glass wastewater, comprising the steps of:

(a) collecting alkalophilic/alkaline-tolerant microbes from water treatment facilities;
(b) culturing said microbes in water glass wastewater with ADMI ranging from 200–45,000,
(c) introducing said microbes to biodegrade said water glass wastewater without any prior pH adjustment of said wastewater; and
(d) distilling said wastewater to obtain concentrated water glass for reuse.

12. The method of claim 11, wherein said alkalophilic/alkaline-tolerant microbes are cultured on activated carbon.

* * * * *